United States
von Hundelshausen 3,767,287

Oct. 23, 1973

[54] ARRANGEMENT FOR CHANGING THE DIRECTION OF POLARIZATION OF A POLARIZED BEAM OF LIGHT

[75] Inventor: Ulrich Freiherr von Hundelshausen, Munich, Germany

[73] Assignee: Siemens Aktiengesellschaft, Berlin and Munich, Germany

[22] Filed: Feb. 2, 1972

[21] Appl. No.: 222,773

[30] Foreign Application Priority Data
Feb. 10, 1971 Germany............... P 21 06 365.0

[52] U.S. Cl. ............................... 350/150, 350/160
[51] Int. Cl. ................................................ G02f 1/26
[58] Field of Search.............. 350/147, 150, 157, 350/160; 331/94.5 M; 252/300, 30.6

[56] References Cited
UNITED STATES PATENTS
3,373,376   3/1968   Clark et al. ...................... 350/150

Primary Examiner—Ronald L. Wibert
Assistant Examiner—Michael J. Tokar
Attorney—Carlton Hill et al.

[57] ABSTRACT

A method for influencing a light beam by applying an electrical signal to cause phase modulation, amplitude modulation or deflection of the light beam using an electro-optic crystal made of a compound having a cation and an anion and containing a thiocyanate complex in the anion. The compound has two different metals which are selected from Groups I and II of the periodic system of elements. Preferably one of the metals is mercury and forms with the thiocyanate complex the anion complex having a formula of $[Hg(SCN)_4]$. The other metal is preferably selected from a group consisting of zinc, cadmium, copper and gold. The electro-optic crystal is used with a polarizer to phase modulate a light beam in accordance to the voltage applied to the electrodes of the crystal or the electro-optic crystal can be used to amplitude modulate a light beam by being placed between a pair of polarizers. The electro-optic crystal can be utilized between a polarizer and a prism to deflect a light beam in accordance with the voltage applied to the crystal.

4 Claims, 3 Drawing Figures

ARRANGEMENT FOR CHANGING THE DIRECTION OF POLARIZATION OF A POLARIZED BEAM OF LIGHT

BACKGROUND OF THE INVENTION

1. Field of the Invention

The present invention is directed to electro-optic crystal and a method of using the electro-optic crystal to influence a light beam in response to an electrical signal applied to the crystal.

2. Prior Art

Electro-optic crystals consisting of a material whose optical characteristics are changed by the application of a voltage to electrodes on the crystal surfaces are known in the art. Such crystals are utilized to change the direction of polarization of a polarized beam of light such as a polarized laser beam during amplitude modulation, or phase modulation. Electro-optic crystals have also been utilized with a prism for the purpose of deflecting a beam of light depending on the change of polarization caused by the crystal.

SUMMARY OF THE INVENTION

The present invention is directed to an electro-optic crystal and a method of using the crystal for influencing a beam of light in response to a voltage applied to the electrodes of the crystal. The electro-optic crystal comprises a compound having a cation and an anion and containing a thiocyanate complex in the anion. The compound preferably includes two different metals which are selected from Groups I and II of the periodic system of elements. One of the metals is preferably mercury and forms with the thiocyanate complex the anion having a formula of $[Hg(SCN)_4]$. The other metal is preferably selected from a group consisting of zinc, cadmium copper and gold. The electro-optic crystal is used with a polarizer which polarizes light prior to passing through the crystal which due to the direction of the application of a voltage to the crystal causes phase modulation in the beam of light or if a second polarizer is utilized to analyze the light passing through the crystal can cause an amplitude modulation of a beam of light. In another embodiment of using the crystal, the crystal is located between a polarizer and a prism which deflects the beam depending the direction of polarization applied to the beam of light as it passes through electro-optic crystal which is being modulated by the application of voltage to its electrodes.

DESCRIPTION OF THE PREFERRED EMBODIMENTS

The principles of the present invention are particularly useful in providing an electro-optic crystal utilized to influence a light beam by changing the direction of polarization of a polarized light beam as it passes through the crystal which changes in polarization are dependent upon a voltage applied to electrodes provided on the crystal.

The crystal is made of a compound having a cation and an anion with a thiocyanate complex in the anion of the compound. The compound contains two different metals which were selected from Groups I and II of the periodic system of elements. Preferably one of the metals is mercury and forms with the thiocyanate complex the anion complex of the compound which has a formula of $[Hg(SCN)_4]$. The other metal is selected from Groups I and II of the periodic system of elements and preferably is a metal selected from a group consisting of zinc, cadmium, copper or gold which forms the cation of the compound which will have a formula such as $Zn[Hg(SCN)_4]$ or $Cd[Hg(SCN)_4]$.

Electro-optic crystals of the above mentioned compound can be obtained for instance from a gel in particular silica gel in which the components are brought to a reaction. This method enables the obtaining of large crystals of the compound which are hardly soluble and thus will only be finally crystallized during the usual precipitation. The method for producing the compound, for instance may include the formation of the gel, in its first step, containing one of the components of the crystal. The other reaction component is then inserted into the gel by means of coating the gel with an aqueous solution containing the other component which solution diffuses into the gel. However, the intrusion of the reaction component can also be effected from other kinds of solutions or from the gas phase.

Crystals containing these compounds belong to the tetragonal crystal glass $\overline{14}$, and has electro-optic coefficients, which do not disappear, of $r_{13} = -r_{23}$, $r_{41} = r_{52}$, $r_{51} = -r_{42}$ and $r_{63}$. The c-axis is the optical axis of the crystal and the two axes which are vertical to the c-axis are the a-axes.

Figure 1:
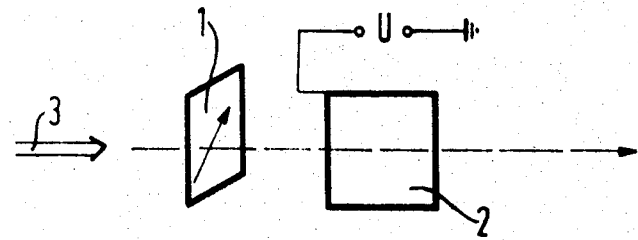
FIG. 1 is a schematic arrangement of a phase modulator utilizing an electro-optic crystal and method of the present invention.

An embodiment of the method for utilizing the electro-optic crystal for influencing a light beam by phase modulating is schematically illustrated in FIG. 1. The apparatus for phase modulating a light beam comprises a polarizer 1 arranged to polarize a light beam, such as a laser beam 3, prior to passing through an electro-optic crystal 2 made of a compound such as zinc-mercury-thiocyanate of a formula $Zn[Hg(SCN)_4]$. An electrical signal to control phase modulation applies a control voltage U to electrodes on the electro-optic crystal 2 which voltage induces an electric field in the crystal and changes the optical characteristics of the crystal in response to the applied voltage to phase modulate the light beam passing through the crystal. The largest degree of modulation of the light beam occurs when the direction of polarization of polarizer 1 coincides with the main axis of the refraction-index ellipsoid which is induced in the crystal by the electrical field created by the applied voltage.

In order to utilize a transverse electro-optic effect of the crystal 2, the electrical field and the polarizer 1 are arranged with their direction parallel to the c-axis of the crystal 2 while the light beam hits the crystal parallel to the a-axis (electrical optical coefficients $r_{13}$, $r_{23}$ are utilized). Alternately, the direction of the electrical field can be arranged to be parallel to an a-axis of the crystal 2 but vertical to the light beam, and the polarizer 1 is arranged with its direction of polarization at an angle of 45° to the a-axis and the light beam which extends parallel to an a-axis (electrical optical coefficients $r_{51}$, $r_{42}$ are utilized).

In order to utilize the longitudinal effect of the electro-optic crystal 2, the light beam and electric fields are arranged with a direction parallel to the $a$-axis of the crystal, and the polarizer is arranged with the direction of polarization at an angle of 45° to the $a$-axis (electrical optical coefficients $r_{41}$, $r_{52}$ are utilized). In an alternate arrangement for utilizing the longitudinal effect of the crystal, either the direction of the light beam or the direction of the electrical field or both can be arranged to extend parallel to the $c$-axis, and the direction of polarization of the polarizer is arranged at an angle of 45° to the $c$-axis of the crystal (electrical optical coefficient $r_{63}$ is utilized).

The electro-optic crystal of the present invention can be utilized in a method for amplitude modulating of a light beam in an arrangement in which the crystal 2 is arranged between a polarizer 1 and a second polarizer means such as a polarizer 4 so that the light beam 3 passes through the polarizer 1, through the crystal 2, and then through the polarizer 4. As illustrated, the polarizers 1 and 4 are cross polarizers with the direction of polarization extending at right angles to each other. Thus when a beam is polarized by a polarizer 1 into one direction and this direction of polarization is rotated by the passing of the light beam through the electro-optic crystal 2, the second polarizer 4, which is often referred to as a polarization analyzer, will produce an amplitude modulated beam of light depending on the amount of rotation of the polarization of the light beam as it passes through the crystal 2. It is possible to arrange the polarizer or analyzer 4 with its direction parallel to the direction of the polarizer 1 and a greatest amplitude would occur when the crystal 2 does not alter the direction of polarization of the light beam passing therethrough.

Figure 2:
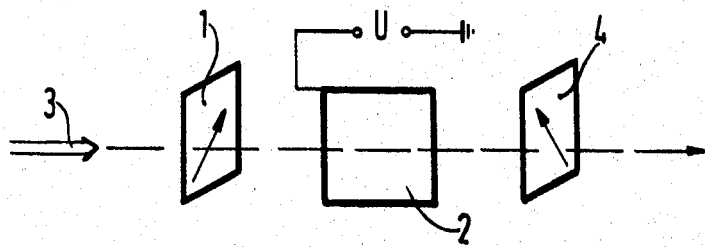
FIG. 2 is a schematic arrangement of an amplitude modulator utilizing the elctro-optic crystal and method of the present invention.

The highest degree of modulation in the device of FIG. 2 is obtained when the polarization direction of the light beam does not coincide with the main axis of the refraction-index ellipsoid which is induced by the electrical field caused by the application of voltage U to the electrodes of the crystal 2. In fact, the highest degree of modulation occurs when the direction of polarization is at an angle of 45° to the main axis of the ellipsoid.

In order to utilize the transverse electro-optic effect of the crystal 2, the light beam is arranged to be parallel to the $a$-axis with the electrical field being parallel to the $c$-axis and the direction of polarization of the polarizer 1 and the analyzer 4 are at an angle of 45° to the $c$-axis of the crystal (the electrical optical coefficients $r_{13}$, $r_{23}$ are utilized). Alternately, the light beam is arranged to be parallel to the a-axis with the electrical field parallel to the $a$-axis but vertical to the direction of the light beam and the polarizer 1 and analyzer 4 are arranged with their direction parallel to the $a$-axis (electrical optical coefficients $r_{51}$, $r_{42}$ are utilized).

In order to utilize the longitudinal effect of the electro-optic crystal 2, the direction of the light beam and electrical field are arranged to be either parallel to the $a$-axis with the polarizer 1 and analyzer 4 to the a or c-axis (electrical optical coefficients $r_{41}$, $r_{52}$ are utilized) or the direction of the light beam and the electrical fields are arranged parallel to the $c$-axis with the direction of the polarizer 1 and the analyzer 4 parallel to the $a$-axis (electrical optical coefficient $r_{63}$ is utilized).

Figure 3:
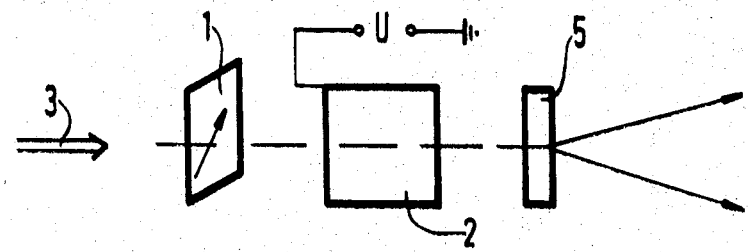
FIG. 3 is a schematic arrangement of a light deflector utilizing the electro-optic crystal and method of the present invention.

The electro-optic crystal 2 can be utilized in a method for deflecting a light beam in response to an electrical signal. The arrangement is schematically illustrated in FIG. 3 for passing a light beam such as laser beam 3 through a polarizer 1, through the crystal 2 and then through a prism 5 which separates the light beam into one of two paths depending on its direction of polarization. For instance the prism 5 may be a Nicol prism, a Wollaston prism or a Rochon prism, which are known in the art. The best results are obtained when the polarization direction of the light beam does not coincide with the main axis of the refraction-index ellipsoid which is induced by the electrical field caused in the crystal by the applied voltage. In the operation of the apparatus of FIG. 3, the application of a halfway voltage to the crystal 2 will cause the light beam 3 to be deflected in one of two directions by the prism 5. When no voltage is applied to the crystal 2, the light beam will be deflected by the prism 5 in the other direction which direction is illustrated as an arrowed line. By arranging several such crystals and prisms in series the beam of light can be deflected in several directions with the number of directions being equal to $2^n$ where $n$ is the number of crystals used.

In each of the above embodiments of the method for utilizing the crystal, both the transverse and longitudinal electro-optic effects can be utilized. For example, the electrical field which is applied to the crystal for the control, can coincide with the direction of inclination of the light beam or be vertical to the direction of inclination of the light beam. Also the inclination direction of the light beam can be applied with respect to the crystal axis and the electrical field can be utilized which is applied at that inclination. However since only the stated electrical optical coefficients can be utilized, the fields must be derived from above described coefficients.

Although various modifications might be suggested by those versed in the art it should be understood that I wish to embody within the scope of the patent warranted hereon all such modifications that reasonably and properly come within the scope of my contribution to the art.

I claim:

1. An arrangement for changing the direction of polarization of a polarized beam of light in response to a voltage applied to an electro-optic crystal, the arrangement comprising at least one polarizer to polarize a beam of light to one direction of polarization, and an electro-optic crystal disposed in a path of the polarized beam of light passing through the polarizer, said crystal having a pair of electrodes for selectively applying a voltage to the crystal in a direction extending transverse to the path of the beam of light through the crystal to create an electrical field which causes rotation of the direction of polarization of the beam of polarized light, said crystal consisting of a thiocyanate complex and two different metals selected from a group consisting of mercury, zinc, cadmium, copper, and gold, one of the two metals being a cation and the other of the two metals forming with the thiocyanate complex an anion complex.

2. An arrangement according to claim 1, wherein said other of two metals consist of mercury and forms with the thiocyanate complex an anion complex having a formula of $[Hg(SCN)_4]$.

3. An arrangement according to claim 1, wherein said crystal consists of a crystal having a formula of $Cd[Hg(SCN)_4]$.

4. An arrangement according to claim 1, wherein said crystal consists of a crystal having a formula of $Zn[Hg(SCN)_4]$.

* * * * *